(12) United States Patent
Fujiwara et al.

(10) Patent No.: US 8,649,196 B2
(45) Date of Patent: Feb. 11, 2014

(54) POWER CONVERTING APPARATUS WITH AN OUTPUT VOLTAGE THAT IS THE SUM OF VOLTAGES GENERATED BY INDIVIDUAL INVERTERS

(75) Inventors: Kenji Fujiwara, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 13/145,573

(22) PCT Filed: Nov. 10, 2009

(86) PCT No.: PCT/JP2009/005967
§ 371 (c)(1),
(2), (4) Date: Jul. 21, 2011

(87) PCT Pub. No.: WO2010/086929
PCT Pub. Date: Aug. 5, 2010

(65) Prior Publication Data
US 2011/0273916 A1 Nov. 10, 2011

(30) Foreign Application Priority Data

Jan. 29, 2009 (JP) ................................ 2009-017719

(51) Int. Cl.
*H02M 7/48* (2007.01)
(52) U.S. Cl.
USPC ......................................................... 363/71
(58) Field of Classification Search
USPC ........ 363/62, 65, 71, 72, 95, 97, 98, 131, 132
See application file for complete search history.

(56) References Cited

U.S. PATENT DOCUMENTS

| | | | | |
|---|---|---|---|---|
| 6,236,580 B1 * | 5/2001 | Aiello et al. | ..................... | 363/65 |
| 6,320,767 B1 * | 11/2001 | Shimoura et al. | ............... | 363/37 |
| 7,577,007 B2 * | 8/2009 | Mori et al. | ....................... | 363/71 |

(Continued)

FOREIGN PATENT DOCUMENTS

| JP | 2004 328831 | 11/2004 |
|---|---|---|
| JP | 2006 246676 | 9/2006 |

(Continued)

OTHER PUBLICATIONS

International Search Report issued Dec. 8, 2009 in PCT/JP09/005967 filed Nov. 10, 2009.

(Continued)

*Primary Examiner* — Gary L Laxton
*Assistant Examiner* — Alex Torres-Rivera
(74) *Attorney, Agent, or Firm* — Oblon, Spivak, McClelland, Maier & Neustadt, L.L.P.

(57) ABSTRACT

A power converting apparatus includes a first inverter (3) connected to a first DC power supply (1) and a plurality of second inverters (4A, 4B) connected in series to the first DC power supply (1). The plurality of second inverters (4A, 4B) provide compensation to an output voltage of the first inverter (3) by the sum of outputs at which a power balance becomes approximately zero. The power converting apparatus generates output voltage commands (VrefA, VrefB) for the respective second inverters (4A, 4B) upon individually making an adjustment so that DC bus voltages of the second inverters (4A, 4B) become equal to each other depending on whether charging or discharging mode is selected while keeping the sum of the individual output voltage commands (VrefA, VrefB) at a target sum voltage (Vref2).

8 Claims, 13 Drawing Sheets

(56) References Cited

U.S. PATENT DOCUMENTS

| | | | |
|---|---|---|---|
| 7,602,626 B2 * | 10/2009 | Iwata et al. | 363/71 |
| 7,638,983 B2 * | 12/2009 | Park et al. | 363/71 |
| 2008/0157598 A1 * | 7/2008 | Kuitani et al. | 307/45 |
| 2009/0015071 A1 | 1/2009 | Iwata et al. | |

FOREIGN PATENT DOCUMENTS

| | | | |
|---|---|---|---|
| JP | 2007 37355 | | 2/2007 |
| WO | 2006 090674 | | 8/2006 |
| WO | WO2006090674 | * | 8/2006 |

OTHER PUBLICATIONS

Chinese Office Action (with partial English translation) issued on Jun. 4, 2013, in counterpart Chinese Appln No. 200980155648.3 (9 pages).

* cited by examiner

POWER CONVERTING APPARATUS WITH AN OUTPUT VOLTAGE THAT IS THE SUM OF VOLTAGES GENERATED BY INDIVIDUAL INVERTERS

TECHNICAL FIELD

The present invention relates to a power converting apparatus which converts DC power into AC power and, in particular, the invention is concerned with a power converting apparatus used as a power conditioner, for example, which connects a photovoltaic voltage to a power system.

BACKGROUND ART

A power conditioner used as a conventional power converting apparatus is configured to obtain an output voltage from the sum of voltages generated by individual inverters with an AC side of a single-phase inverter (first inverter) whose DC source is a DC voltage obtained by boosting a photovoltaic voltage by a chopper circuit and AC sides of the other inverters (second and third inverters) connected in series, the power conditioner being capable of outputting a voltage higher than the DC voltage boosted by the chopper circuit. Also, the power conditioner is controlled such that outputs of the second and third inverters become equal to each other (refer to Patent Document 1, for example).

PRIOR ART DOCUMENT

Patent Document

Patent Document 1: International publication No. WO2006/090674

SUMMARY OF THE INVENTION

Problems to be Solved by the Invention

In the conventional power converting apparatus, the two inverters other than the first inverter of which input is the output DC voltage of the chopper circuit are provided with DC/DC converters serving as DC power sources to maintain DC bus voltages at a constant level. For this reason, the DC bus voltages of the two inverters are kept equal to each other and, thus, the output of the power converting apparatus is controlled with high reliability. There has however been a problem that the provision of the DC/DC converters which are hardware results in an increase in the structure of the apparatus as well as an increase in cost.

The present invention has been made to solve the aforementioned problem. Accordingly, it is an object of the invention to suppress an imbalance of DC bus voltages of a plurality of inverters connected to a first inverter and stabilize the DC bus voltages with an inexpensive and compact apparatus structure.

Means for Solving the Problems

A power converting apparatus according to the present invention includes a first inverter which converts DC power fed from a first smoothing capacitor connected to a first DC power supply into AC power and a plurality of second inverters which are connected in series to an AC output line of the first inverter and convert DC power fed from respective second smoothing capacitors into AC power, wherein voltages of the second smoothing capacitors are lower than a voltage of the first smoothing capacitor, the plurality of second inverters output voltages approximately equal to each other by performing PWM control so that an output power balance during one cycle becomes approximately zero, and the power converting apparatus outputs the sum of an output voltage of the first inverter and the output voltages of the second inverters. The power converting apparatus further includes voltage command generating means for individually generating output voltage commands for the second inverters, wherein the voltage command generating means generates the output voltage commands upon individually making an adjustment so that the voltages of the individual second smoothing capacitors become equal to each other depending on whether the second smoothing capacitors are in charging or discharging mode while keeping the sum of the individual output voltage commands at a target sum voltage to be matched by the sum of the output voltages of the plurality of second inverters.

Advantageous Effects of the Invention

According to the present invention, the voltage command generating means generates the output voltage commands for the individual second inverters upon individually making an adjustment so that the voltages of the individual second smoothing capacitors become equal to each other depending on whether the second smoothing capacitors are in charging or discharging mode. Therefore, DC bus voltages of the plurality of second inverters can be stabilized with an imbalance therebetween suppressed. Also, it is not necessary to exchange DC power with the exterior, requiring no DC/DC converter or the like, and thus it is possible to provide an apparatus structure featuring a reduced cost and advanced compactness.

MODES OF CARRYING OUT THE INVENTION

First Embodiment

Figure 1:
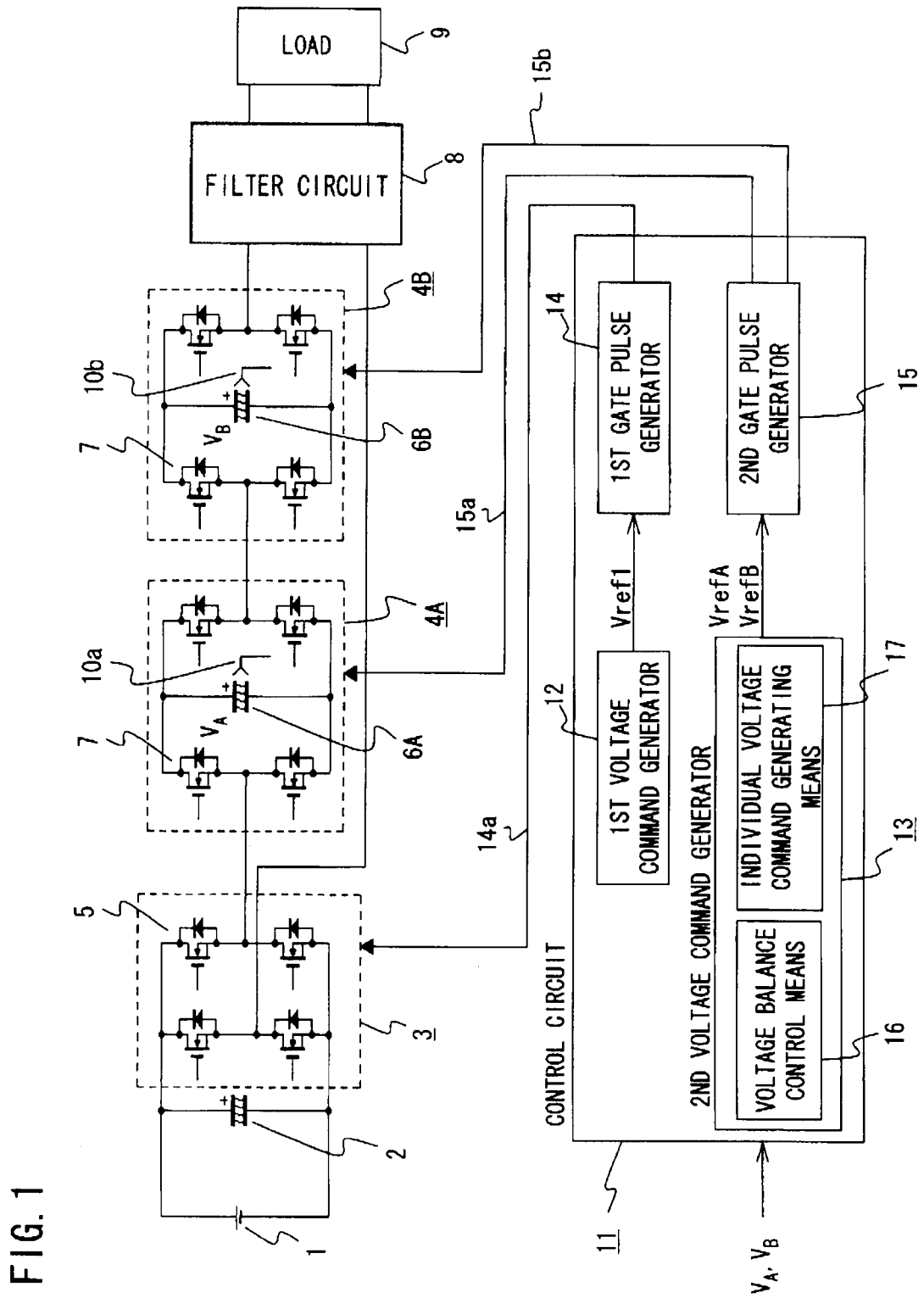
FIG. 1 is a diagram illustrating the configuration of a power converting apparatus according to a first embodiment of the present invention.

A power converting apparatus according to a first embodiment of the present invention is now described. FIG. 1 is a diagram illustrating the configuration of the power converting apparatus according to the first embodiment of this invention.

As illustrated in FIG. 1, a first smoothing capacitor 2 for smoothing a DC bus voltage is connected to a first DC power supply 1 made up of a solar battery, for example, to supply DC power to a first inverter 3 made up of a single-phase full-bridge inverter. A plurality (two in this case) of second inverters 4A, 4B are connected in series to an AC output line of the first inverter 3.

The first inverter 3 which is provided with a plurality of self-turn-off semiconductor switching devices 5 (hereinafter referred to as the semiconductor switches 5) like metal oxide semiconductor field effect transistors (MOSFETs) converts DC power fed from the first smoothing capacitor 2 into AC power. The second inverters 4A, 4B which are provided with mutually independent second smoothing capacitors 6A, 6B and a plurality of self-turn-off semiconductor switching devices 7 (hereinafter referred to as the semiconductor switches 7) like MOSFETs convert DC power of the second smoothing capacitors 6A, 6B into AC power, respectively. Output voltages of the individual second inverters 4A, 4B are superimposed on an output voltage of the first inverter 3 and sine-wave AC power is applied to a load 9 through a filter circuit 8. There are also provided voltage sensors 10a, 10b for detecting voltages $V_A$, $V_B$ of the second smoothing capacitors 6A, 6B, respectively. Here, the voltages of the second smoothing capacitors 6A, 6B are made lower than a voltage of the first smoothing capacitor 2.

There is further provided a control circuit 11 employing a processing device like a digital signal processor (DSP) or a field-programmable gate array (FPGA), for example. The control circuit 11 includes a first voltage command generator 12 for generating an output voltage command Vref1 for the first inverter 3, a second voltage command generator 13 which serves as voltage command generating means for generating output voltage commands VrefA, VrefB for the second inverters 4A, 4B, respectively, a first gate pulse generator 14 for generating a gate pulse 14a for controllably driving the first inverter 3 based on the output voltage command Vref1 for the first inverter 3, and a second gate pulse generator 15 for generating gate pulses 15a, 15b for controllably driving the second inverters 4A, 4B based on the output voltage commands VrefA, VrefB for the second inverters 4A, 4B, respectively.

The second voltage command generator 13 includes voltage balance control means 16 for detecting an imbalance between the voltages $V_A$, $V_B$ of the second smoothing capacitors 6A, 6B obtained from the voltage sensors 10a, 10b, respectively, and performing a control calculation so as to balance the voltages $V_A$, $V_B$, and individual voltage command generating means 17 for generating the output voltage commands VrefA, VrefB for the second inverters 4A, 4B, respectively, based on the result of the control calculation performed by the voltage balance control means 16.

The working of the power converting apparatus configured as described above is explained hereunder.

Figure 2:
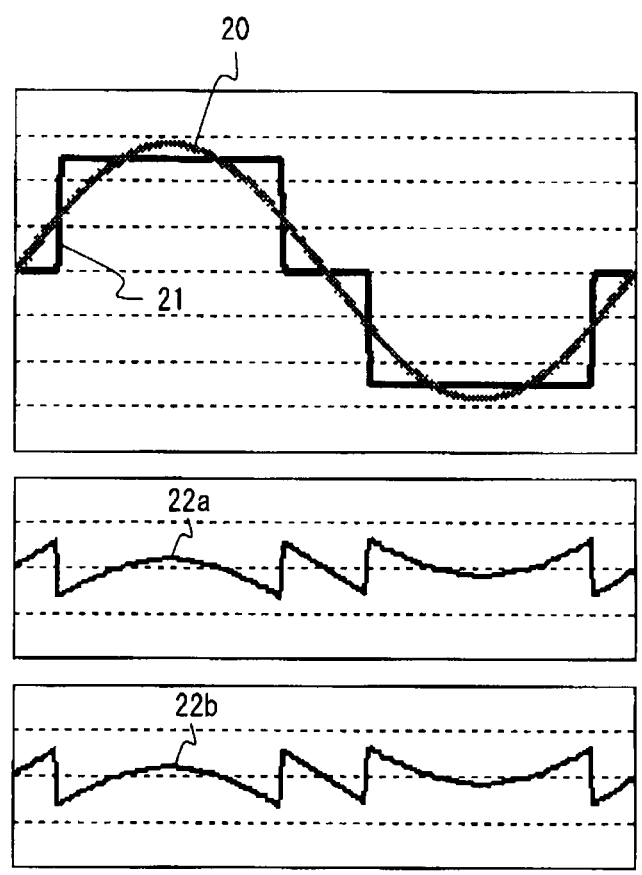
FIG. 2 is a diagram depicting output voltage waveforms of first and second inverters according to the first embodiment of the present invention.

FIG. 2 is a diagram depicting output voltage waveforms of the first and second inverters 3, 4A, 4B of the power converting apparatus. Designated by 20 is a sine-wave voltage output by the entire power converting apparatus to the load 9. The output voltage 21 of the first inverter 3 has a pulse waveform containing pulses generated at a rate of one pulse per half cycle, and the second inverters 4A, 4B output voltages 22a, 22b that would make up for a difference between the sine-wave voltage and the output voltage 21 of the first inverter 3 by a pulse width modulation (PWM) method. In this case, the output voltages 22a, 22b of the individual second inverters 4A, 4B are approximately equal to each other and the sum of these voltages is used to make up for the difference between the sine-wave voltage and the output voltage 21 of the first inverter 3. Thus, the sum of the output voltages of the series-connected first and second inverters 3, 4A, 4B is output to the load 9.

Figure 3:
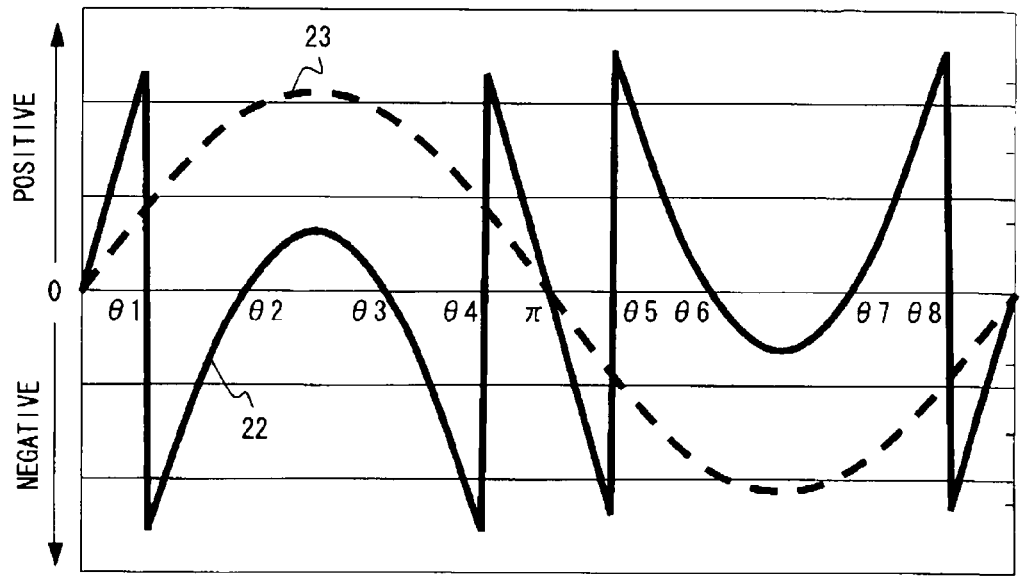
FIG. 3 is a diagram depicting a voltage waveform of a sum voltage of individual output voltages of the second inverters according to the first embodiment of the present invention.
Figure 4:
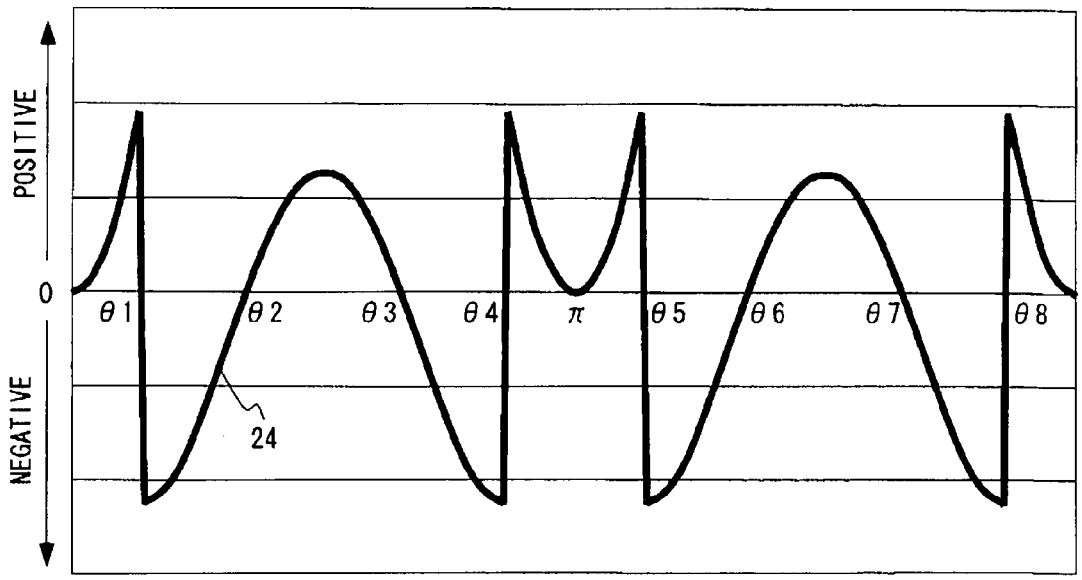
FIG. 4 is a diagram depicting an electric power waveform of summed power of individual output power components (instantaneous values) of the second inverters according to the first embodiment of the present invention.

FIG. 3 illustrates a voltage waveform of a sum voltage 22 of the output voltages 22a, 22b of the individual second inverters 4A, 4B. Designated by 23 is an output current waveform of the power converting apparatus. Also, FIG. 4 illustrates an electric power waveform of summed power 24 of individual output power components (instantaneous values) of the second inverters 4A, 4B. Unlike the case of an ordinary PWM inverter which produces electric power having only a positive polarity, there exist a period during which the output power (summed power 24) of the second inverters 4A, 4B has a positive polarity as well as a period during which the output power has a negative polarity as depicted in FIG. 4, and the individual second smoothing capacitors 6A, 6B are discharged during the period of the positive polarity and charged during the period of the negative polarity. Then, electric power is output by the PWM method in such a manner that the amounts of positive and negative power components become equal to each other, or such that a power balance during one cycle becomes approximately zero.

Next, control operation performed by the control circuit 11 is described.

The first voltage command generator 12 generates the output voltage command Vref1 so that the first inverter 3 outputs a pulse voltage containing pulses generated at a rate of one pulse per half cycle based on the sine-wave voltage which is an output target of the entire power converting apparatus and the voltage of the first smoothing capacitor 2. The pulse width of this pulse voltage is determined such that a power balance (summed power balance) of the second inverters 4A, 4B that output the sum voltage 22 used for making up for the difference between the sine-wave voltage and the output voltage 21 of the first inverter 3 becomes approximately zero. The first gate pulse generator 14 generates the gate pulse 14a for controllably driving the individual semiconductor switches 5 of the first inverter 3 based on the output voltage command Vref1.

The second voltage command generator 13 which is provided with the voltage balance control means 16 and the individual voltage command generating means 17 individually generates the output voltage commands VrefA, VrefB for the respective second inverters 4A, 4B so that the voltages $V_A$, $V_B$ of the second smoothing capacitors 6A, 6B are balanced. The second gate pulse generator 15 generates the gate pulses 15a for controllably driving the individual semiconductor switches 7 of the second inverter 4A based on the output voltage command VrefA as well as the gate pulses 15b for controllably driving the individual semiconductor switches 7 of the second inverter 4B based on the output voltage command VrefB.

Figure 5:
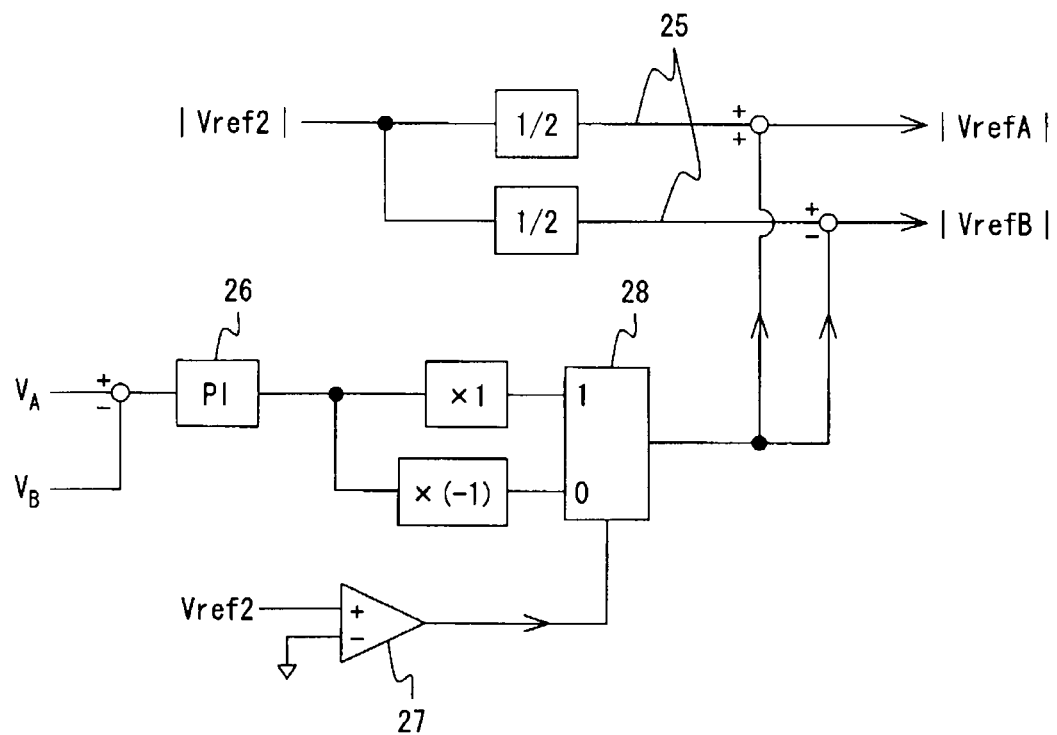
FIG. 5 is a control block diagram of a second voltage command generator according to the first embodiment of the present invention.

FIG. 5 is a control block diagram of the second voltage command generator 13. It is to be noted that FIG. 5 depicts only a case where the output current 23 has a positive polarity for the sake of explanation.

A target sum voltage Vref2 which becomes an output voltage command for the sum voltage 22 that is the sum of the output voltages of the two second inverters 4A, 4B is generated by subtracting the output voltage command Vref1 for the first inverter 3 from the sine-wave voltage. Then, a reference voltage command 25 is generated by dividing the target sum voltage Vref2 into two equal parts.

On the other hand, an amount of control derived by proportional-integral (PI) control is generated by a circuit 26 so that the difference between the voltage $V_A$ of the second smoothing capacitor 6A and the voltage $V_B$ of the second smoothing capacitor 6B becomes zero and, then, positive and negative amounts of control are generated from the aforementioned amount of control and a value obtained by inverting the plus or minus sign of the amount of control. Also, a comparator 27 detects the polarity of the target sum voltage Vref2 and a circuit 28 outputs one of the positive and negative amounts of control depending on the polarity of the target sum voltage Vref2. Then, the amount of control output from the circuit 28 is added to the reference voltage command 25 to generate one of the output voltage commands VrefA, VrefB and the amount of control is subtracted from the reference voltage command 25 to generate the other of the output voltage commands VrefA, VrefB. It is to be noted that the sum of the two output voltage commands VrefA, VrefB always coincides with the target sum voltage Vref2.

Also, since the target sum voltage Vref2, the reference voltage command 25 and the two output voltage commands VrefA, VrefB have the same polarity, it is assumed here that the individual output voltage commands VrefA, VrefB are generated as absolute values and the reference voltage command 25 is also treated as an absolute value for the sake of simplification.

The voltage balance control means 16 calculates the amount of control for feedback control operation in such a manner that the difference between the voltage $V_A$ of the second smoothing capacitor 6A and the voltage $V_B$ of the second smoothing capacitor 6B becomes zero as mentioned above. The individual voltage command generating means 17 calculates the target sum voltage Vref2 and generates the individual output voltage commands VrefA, VrefB upon making an adjustment involving addition and subtraction of the amount of control calculated by the voltage balance control means 16 to and from the reference voltage command 25 obtained by dividing the target sum voltage Vref2 into two equal parts. The direction of this adjustment is determined depending on whether the second smoothing capacitors 6A, 6B are in charging or discharging mode which can be known from the polarity of the target sum voltage Vref2.

When the output current 23 has the positive polarity, that is, when an output of the power converting apparatus has the positive polarity (phase 0-π) as illustrated in FIGS. 3 and 4, the target sum voltage Vref2 has the positive polarity and the second smoothing capacitors 6A, 6B are in the discharging mode in phases 0-θ1, θ2-θ3 and θ4-π whereas the target sum voltage Vref2 has the negative polarity and the second smoothing capacitors 6A, 6B are in the charging mode in phases θ1-θ2 and θ3-θ4.

When the balance between the voltage $V_A$ of the second smoothing capacitor 6A and the voltage $V_B$ of the second smoothing capacitor 6B is lost, resulting in a situation expressed by $V_A > V_B$, the circuit 26 outputs a positive amount of control and the absolute value of the output voltage command VrefA is increased and the absolute value of the output voltage command VrefB is decreased so that the amount of discharging from the second smoothing capacitor 6A becomes larger than the amount of discharging from the second smoothing capacitor 6B in the case of the discharging mode. Also, in the case of the charging mode, the absolute value of the output voltage command VrefB is increased and the absolute value of the output voltage command VrefA is decreased by inverting the sign of the amount of control so that the amount of charging into the second smoothing capacitor 6B becomes larger than the amount of charging into the second smoothing capacitor 6A.

When a situation expressed by $V_A < V_B$ is created, on the other hand, the circuit 26 outputs a negative amount of control and the absolute value of the output voltage command VrefB is increased and the absolute value of the output voltage command VrefA is decreased so that the amount of discharging from the second smoothing capacitor 6B becomes larger than the amount of discharging from the second smoothing capacitor 6A in the case of the discharging mode. Also, in the case of the charging mode, the output voltage command VrefA is increased and the absolute value of the output voltage command VrefB is decreased by inverting the sign of the amount of control so that the amount of charging into the second smoothing capacitor 6A becomes larger than the amount of charging into the second smoothing capacitor 6B.

The working of the individual second inverters 4A, 4B caused by the respective output voltage commands VrefA, VrefB thus generated is described hereunder with reference to FIGS. 6 to 9.

Here, each of the second inverters 4A, 4B is configured such that, among two arms made up of two each semiconductor switches 7 (Q1-Q8), one is a polarity fixing arm 18a, 18b which performs switching operation only when the polarity of the output voltage changes and the other is a PWM arm 19a, 19b which forms a waveform by PWM switching operation. In the second inverter 4A, the polarity fixing arm 18a is configured with the semiconductor switches Q1, Q2 and the PWM arm 19a is configured with the semiconductor switches Q3, Q4. Also, in the second inverter 4B, the polarity fixing arm 18b is configured with the semiconductor switches Q5, Q6 and the PWM arm 19b is configured with the semiconductor switches Q7, Q8.

Figure 6:
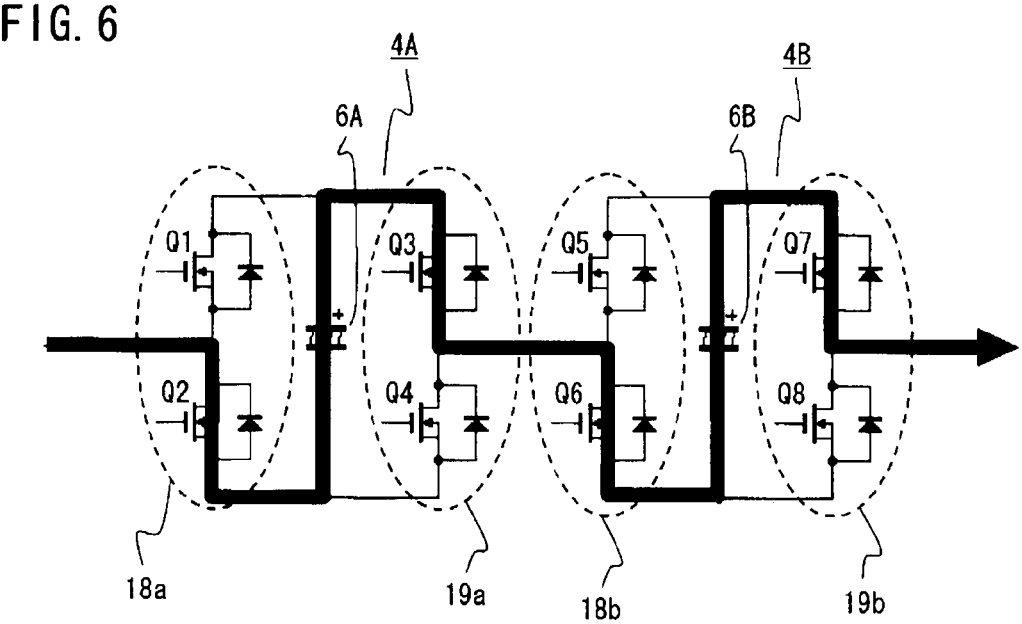
FIG. 6 is a diagram depicting a current path through a plurality of second inverters according to the first embodiment of the present invention.

When the output of the power converting apparatus has the positive polarity and the output voltages 22a, 22b of the individual second inverters 4A, 4B are positive, the output power of the second inverters 4A, 4B has the positive polarity and the second smoothing capacitors 6A, 6B are in the discharging mode, in which case an electric current flowing through the second inverters 4A, 4B flows through a current path depicted in FIG. 6.

In this case, the semiconductor switches Q2, Q6 of the polarity fixing arms 18a, 18b remain constantly ON and the amount of discharging is determined by the individual duty factors of the semiconductor switches Q3, Q7 of the PWM arms 19a, 19b. The duty factors of the semiconductor switches Q3, Q7 are determined according to the absolute values of the individual output voltage commands VrefA, VrefB. Among the semiconductor switches Q3, Q7, one having a higher duty factor more decreases the voltages of the second smoothing capacitors 6A, 6B, more causing the DC bus voltage of each of the second inverters 4A, 4B to drop.

Figure 7:
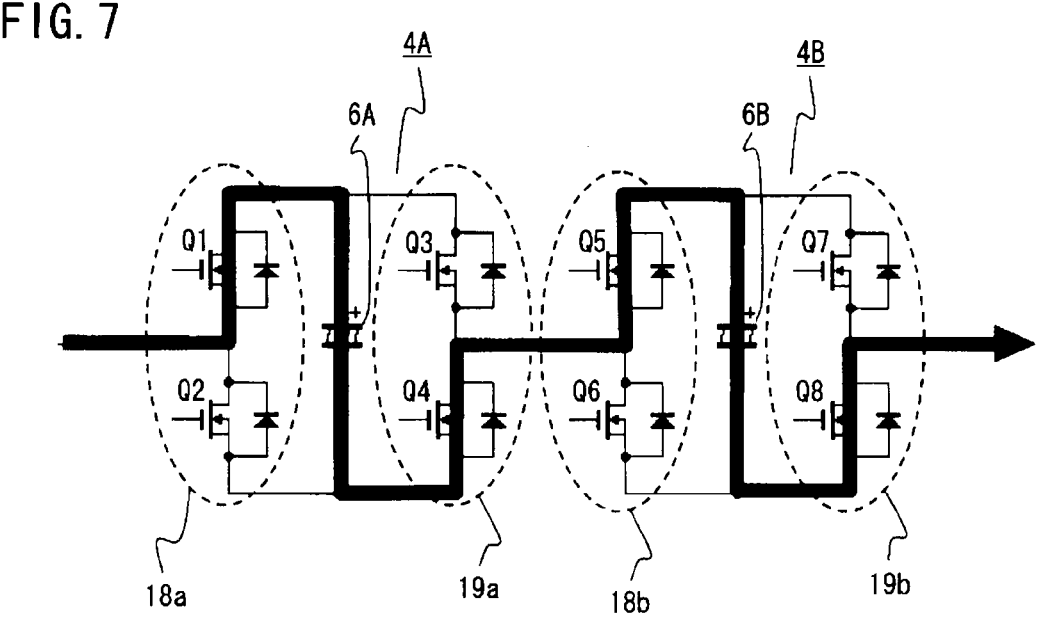
FIG. 7 is a diagram depicting a current path through the plurality of second inverters according to the first embodiment of the present invention.

Next, when the output of the power converting apparatus has the positive polarity and the output voltages 22a, 22b of the individual second inverters 4A, 4B are negative, the output power of the second inverters 4A, 4B has the negative polarity and the second smoothing capacitors 6A, 6B are in the charging mode, in which case the electric current flowing through the second inverters 4A, 4B flows through a current path depicted in FIG. 7.

In this case, the semiconductor switches Q1, Q5 of the polarity fixing arms 18a, 18b remain constantly ON and the amount of charging is determined by the individual duty factors of the semiconductor switches Q4, Q8 of the PWM arms 19a, 19b. The duty factors of the semiconductor switches Q4, Q8 are determined according to the absolute values of the individual output voltage commands VrefA, VrefB. Among the semiconductor switches Q4, Q8, one having a higher duty factor more increases the voltages of the second smoothing capacitors 6A, 6B, more causing the DC bus voltage of each of the second inverters 4A, 4B to increase.

Figure 8:
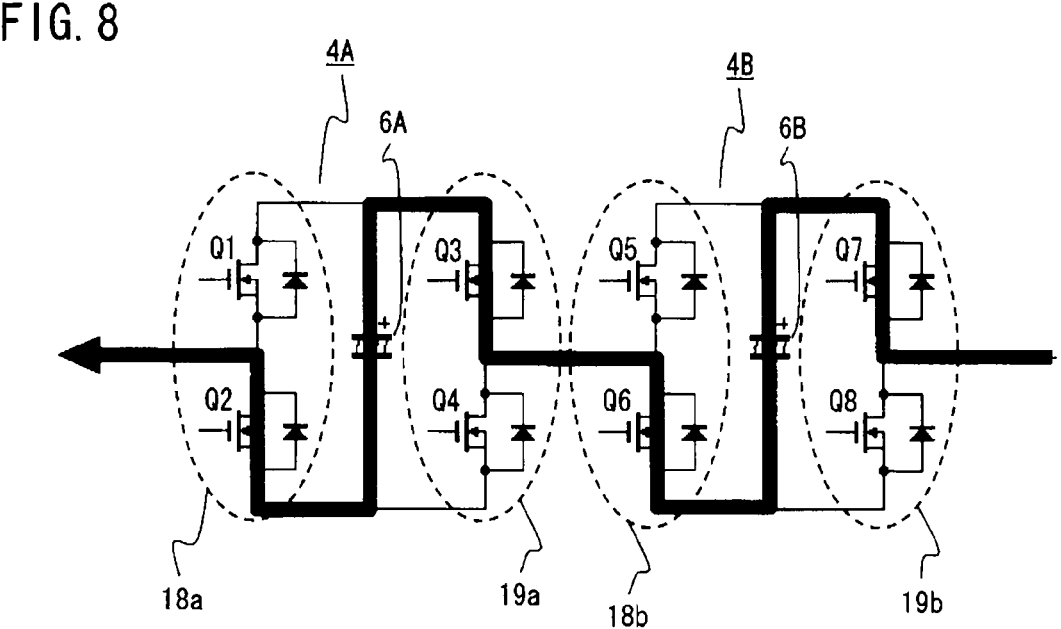
FIG. 8 is a diagram depicting a current path through the plurality of second inverters according to the first embodiment of the present invention.

Next, when the output of the power converting apparatus has the negative polarity and the output voltages 22a, 22b of the individual second inverters 4A, 4B are positive, the output power of the second inverters 4A, 4B has the negative polarity and the second smoothing capacitors 6A, 6B are in the charging mode, in which case the electric current flowing through the second inverters 4A, 4B flows through a current path depicted in FIG. 8.

In this case, the semiconductor switches Q2, Q6 of the polarity fixing arms 18a, 18b remain constantly ON and the amount of charging is determined by the individual duty factors of the semiconductor switches Q3, Q7 of the PWM arms 19a, 19b. The duty factors of the semiconductor switches Q3, Q7 are determined according to the absolute values of the individual output voltage commands VrefA, VrefB. Among the semiconductor switches Q3, Q7, one having a higher duty factor more increases the voltages of the second smoothing capacitors 6A, 6B, more causing the DC bus voltage of each of the second inverters 4A, 4B to increase.

Figure 9:
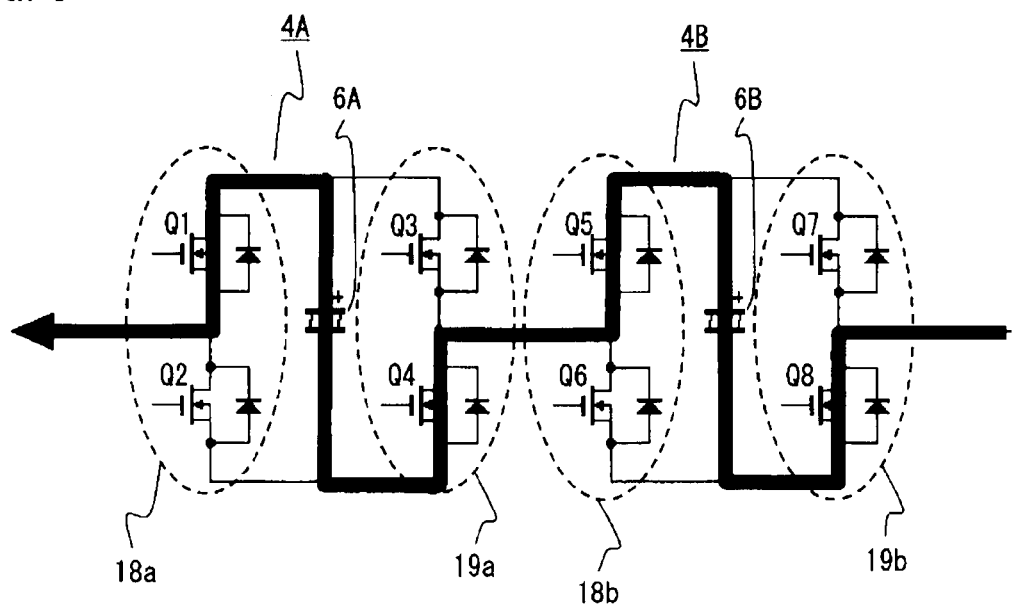
FIG. 9 is a diagram depicting a current path through the plurality of second inverters according to the first embodiment of the present invention.

Next, when the output of the power converting apparatus has the negative polarity and the output voltages 22a, 22b of the individual second inverters 4A, 4B are negative, the output power of the second inverters 4A, 4B has the positive polarity and the second smoothing capacitors 6A, 6B are in the discharging mode, in which case the electric current flowing through the second inverters 4A, 4B flows through a current path depicted in FIG. 9.

In this case, the semiconductor switches Q1, Q5 of the polarity fixing arms 18a, 18b remain constantly ON and the amount of discharging is determined by the individual duty factors of the semiconductor switches Q4, Q8 of the PWM arms 19a, 19b. The duty factors of the semiconductor switches Q4, Q8 are determined according to the absolute values of the individual output voltage commands VrefA, VrefB. Among the semiconductor switches Q4, Q8, one having a higher duty factor more decreases the voltages of the second smoothing capacitors 6A, 6B, more causing the DC bus voltage of each of the second inverters 4A, 4B to drop.

Figure 10:
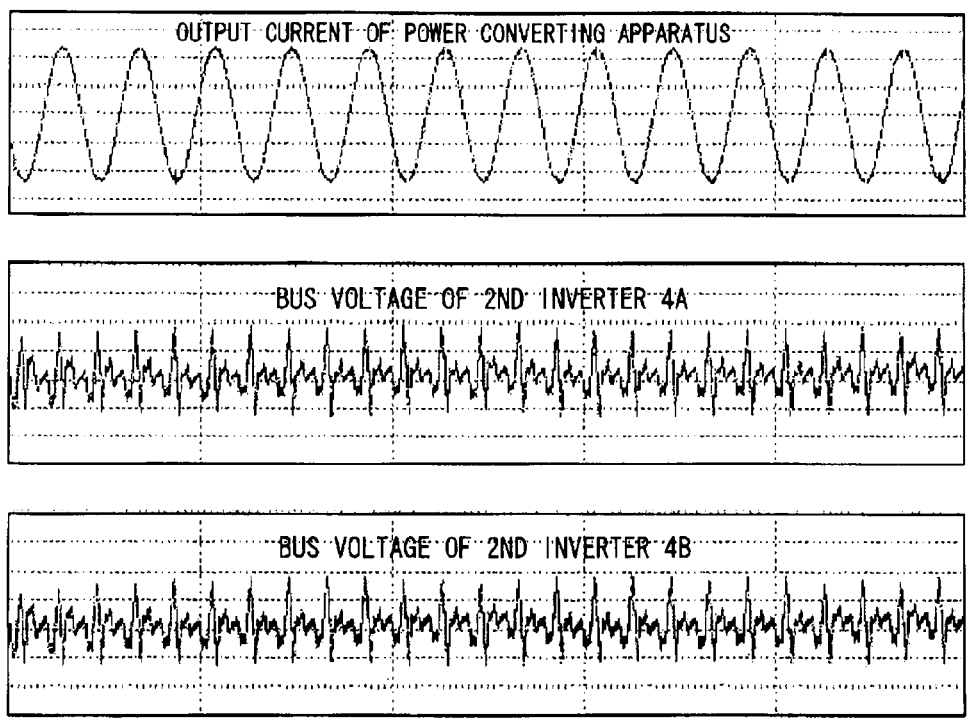
FIG. 10 is a diagram depicting DC bus voltages of the plurality of second inverters according to the first embodiment of the present invention.

As described above, the outputs of the individual second inverters 4A, 4B are controlled by the pertinent output voltage commands VrefA, VrefB in such a manner that the voltages of the two second smoothing capacitors 6A, 6B which work as the respective DC bus voltages become equal to each other. For this reason, an imbalance between the DC bus voltages of the second inverters 4A, 4B is suppressed and the DC bus voltages can be controlled to become equal to each other at a specific value as depicted in FIG. 10.

Figure 11:
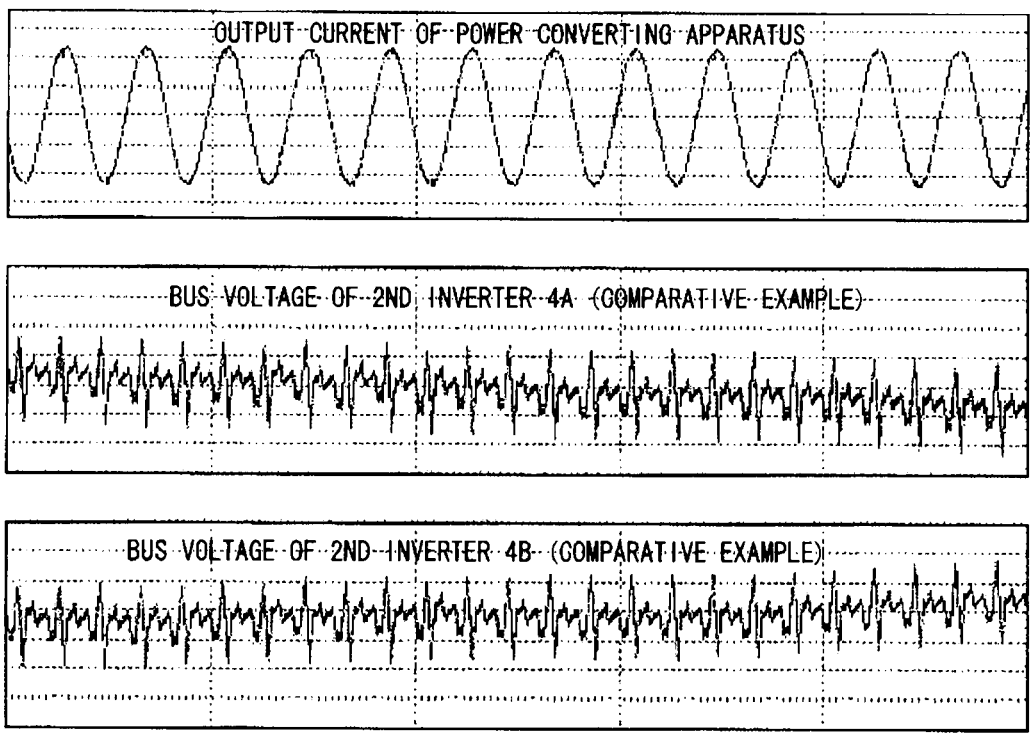
FIG. 11 is a diagram depicting DC bus voltages of a plurality of second inverters according to a comparative example of the first embodiment of the present invention.

Described below as a comparative example is a case in which the reference voltage command 25 obtained by dividing the target sum voltage Vref2 into two equal parts is directly used as the output voltage command for the individual second inverters 4A, 4B. Although the two second inverters 4A, 4B are configured in the same fashion, the second inverters 4A, 4B have different circuit constants in actuality due to a difference in impedance between the second smoothing capacitor 6A and the second smoothing capacitor 6B, a difference in pattern between the second inverters 4A, 4B and a difference in properties of the semiconductor switches 7. Therefore, when the two second inverters 4A, 4B are caused to continuously perform switching operation in a similar fashion by the same output voltage command, an imbalance occurs between the DC bus voltages of the individual second inverters 4A, 4B as depicted in FIG. 11, for example. In this case, the DC bus voltage of the second inverter 4A, or the voltage value of the second smoothing capacitor 6A, decreases, while the DC bus voltage of the second inverter 4B, or the voltage value of the second smoothing capacitor 6B, increases.

In the present embodiment, the output voltage commands are generated upon making an adjustment so that the DC bus voltages of the individual second inverters 4A, 4B are balanced as discussed in the foregoing. For this reason, it is possible to control the DC bus voltages of the second inverters 4A, 4B to become equal to each other at a specific value without the need to control the voltages by exchanging DC power with the exterior. Therefore, reliability of output control is improved with an apparatus structure featuring a reduced cost and advanced compactness.

While the feedback control operation involves PI (proportional-integral) control performed in such a manner that the difference between the voltages of the two second smoothing capacitors 6A, 6B becomes zero in the foregoing embodiment, the power converting apparatus may employ a different feedback control operation like proportional control or integral control, for example. Also, the power converting apparatus may be configured to perform feedback control so that the difference between each of the voltages of the second smoothing capacitors 6A, 6B and a target voltage value becomes zero and then generate the output voltage commands for the individual second inverters 4A, 4B.

Also, while the first inverter 3 is configured to output a voltage containing pulses generated at a rate of one pulse per half cycle in the foregoing embodiment, the embodiment is not limited to this configuration. Although it is desirable that the number of pulses generated be a few pulses or less per half cycle for achieving a high efficiency, a first inverter 3 configured to output more pulses is also applicable to the present embodiment.

Second Embodiment

Described next is a power converting apparatus according to a second embodiment of the present invention. In this case, the power converting apparatus has the same configuration as illustrated in FIG. 1.

In control operation of this embodiment, the first inverter 3 is controlled in the same fashion as in the above-described first embodiment. Specifically, the first voltage command generator 12 generates the output voltage command Vref1 so that the first inverter 3 outputs a pulse voltage containing pulses generated at a rate of one pulse per half cycle upon determining the pulse width of the pulse voltage in such a manner that a power balance (summed power balance) of the second inverters 4A, 4B becomes approximately zero. Then, the first gate pulse generator 14 generates the gate pulse 14a for controllably driving the individual semiconductor switches 5 of the first inverter 3 based on the output voltage command Vref1.

The second voltage command generator 13 which is provided with the voltage balance control means 16 and the individual voltage command generating means 17 individually generates the output voltage commands VrefA, VrefB for the respective second inverters 4A, 4B so that the voltages $V_A$, $V_B$ of the second smoothing capacitors 6A, 6B are balanced. The second gate pulse generator 15 generates the gate pulses 15a for controllably driving the individual semiconductor switches 7 of the second inverter 4A based on the output voltage command VrefA as well as the gate pulses 15b for controllably driving the individual semiconductor switches 7 of the second inverter 4B based on the output voltage command VrefB.

In this case, the voltage balance control means 16 compares the voltage $V_A$ of the second smoothing capacitor 6A and the voltage $V_B$ of the second smoothing capacitor 6B and, when the difference therebetween exceeds a specified value, outputs a control signal which causes only one of the second inverters 4A, 4B to provide an output.

The individual voltage command generating means 17 first generates the target sum voltage Vref2 which becomes an output voltage command for the sum voltage 22 that is the sum of the output voltages of the two second inverters 4A, 4B by subtracting the output voltage command Vref1 for the first inverter 3 from the sine-wave voltage in the same fashion as in the above-described first embodiment. Next, the individual voltage command generating means 17 generates the reference voltage command 25 by dividing the target sum voltage Vref2 into two equal parts.

Then, under normal conditions where the difference between the voltage $V_A$ of the second smoothing capacitor 6A and the voltage $V_B$ of the second smoothing capacitor 6B is equal to or smaller than the specified value, the reference voltage command 25 is used as the output voltage commands VrefA, VrefB for the respective second inverters 4A, 4B.

Also, when the difference between the voltage $V_A$ of the second smoothing capacitor 6A and the voltage $V_B$ of the second smoothing capacitor 6B exceeds the specified value, the individual voltage command generating means 17 makes one of the output voltage commands VrefA, VrefB for the second inverters 4A, 4B equal to zero and the other equal to the target sum voltage Vref2. A decision on which output voltage command should be used as the target sum voltage Vref2 is made depending on whether the second smoothing capacitors 6A, 6B are in charging or discharging mode which can be known from the polarity of the target sum voltage Vref2.

Figure 12:
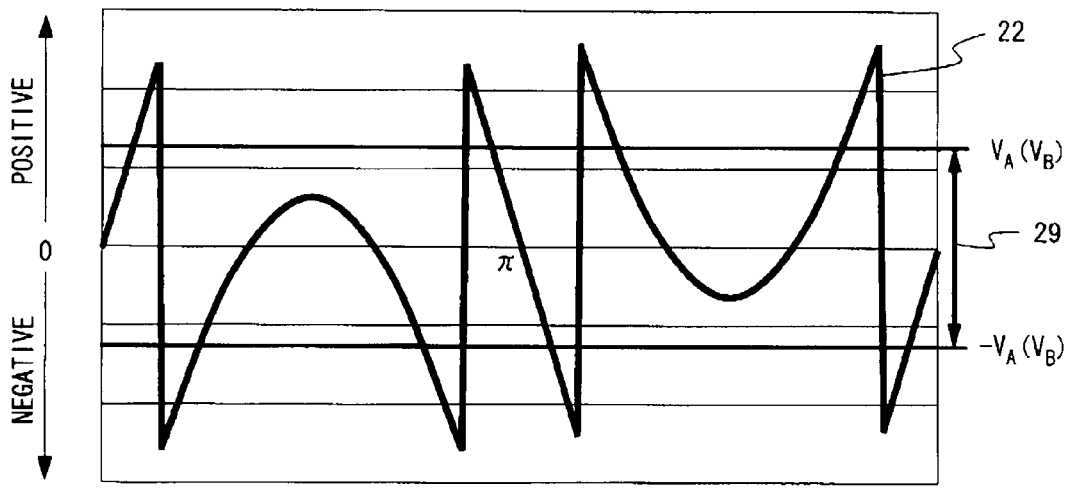
FIG. 12 is a diagram depicting a control range according to a second embodiment of the present invention.

It is to be noted that control operation for causing only one of the second inverters 4A, 4B to output one of the output voltage commands used as the target sum voltage Vref2 can be performed only during periods when the target sum voltage Vref2 falls within a voltage range 29 in which the target sum voltage Vref2 is equal to or lower than voltage levels of the second smoothing capacitors 6A, 6B as depicted in FIG. 12. For this reason, the reference voltage command 25 is used as each of the output voltage commands VrefA, VrefB during periods when a situation expressed by Vref2>$V_A$($V_B$) or Vref2<−$V_A$($V_B$) is created.

Described below is specific control operation performed when the balance between the voltage $V_A$ of the second smoothing capacitor 6A and the voltage $V_B$ of the second smoothing capacitor 6B is destroyed during the periods when the target sum voltage Vref2 falls within the voltage range 29, or during the periods when a situation expressed by −$V_A$($V_B$)≤Vref2≤$V_A$($V_B$) is created.

When $V_A$>$V_B$ and the difference ($V_A$−$V_B$) therebetween exceeds the specified value in the case of the discharging mode, the output voltage command VrefA is made equal to the target sum voltage Vref2 and the output voltage command VrefB is made equal to zero so that only the second smoothing capacitor 6A is discharged. Also, in the case of the charging mode, the output voltage command VrefB is made equal to the target sum voltage Vref2 and the output voltage command VrefA is made equal to zero so that only the second smoothing capacitor 6B is charged. This arrangement causes the voltage $V_A$ of the second smoothing capacitor 6A to drop and the voltage $V_B$ of the second smoothing capacitor 6B to rise.

When $V_A$<$V_B$ and the difference ($V_B$−$V_A$) therebetween exceeds the specified value in the case of the discharging mode, the output voltage command VrefB is made equal to the target sum voltage Vref2 and the output voltage command VrefA is made equal to zero so that only the second smoothing capacitor 6B is discharged. Also, in the case of the charging mode, the output voltage command VrefA is made equal to the target sum voltage Vref2 and the output voltage command VrefB is made equal to zero so that only the second smoothing capacitor 6A is charged. This arrangement causes the voltage $V_A$ of the second smoothing capacitor 6A to rise and the voltage $V_B$ of the second smoothing capacitor 6B to drop.

Figure 13:
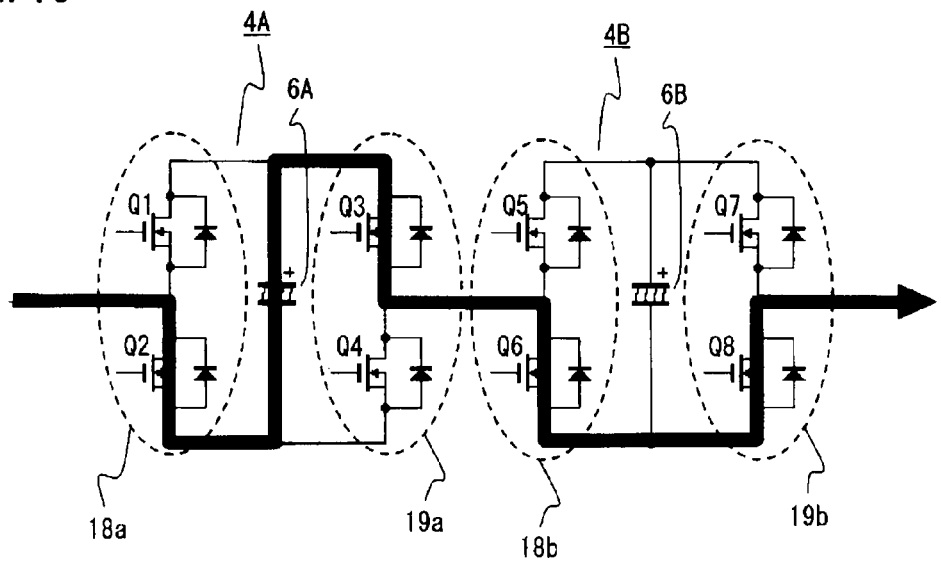
FIG. 13 is a diagram depicting a current path through a plurality of second inverters according to the second embodiment of the present invention.

When causing only the second inverter 4A to provide an output with the output voltage command VrefA made equal to the target sum voltage Vref2 under conditions where $V_A$>$V_B$ in the case of the discharging mode, for example, an electric current flowing through the second inverters 4A, 4B flows through a current path depicted in FIG. 13.

In this case, the semiconductor switches Q6, Q8 of the second inverter 4B are kept constantly ON and the semiconductor switches Q5, Q7 are kept constantly OFF in order to keep the second inverter 4B in a completely shorted state. Then, in the second inverter 4A, the semiconductor switch Q2 of the polarity fixing arm 18a is kept constantly ON and the semiconductor switch Q3 of the PWM arm 19a is turned ON at a duty factor determined according to the absolute value of the output voltage command VrefA (Vref2).

The output voltage commands are generated upon making an adjustment so that the DC bus voltages of the individual second inverters 4A, 4B are balanced as discussed above in this embodiment as well. Accordingly, as is the case with the first embodiment, it is possible to control the DC bus voltages of the second inverters 4A, 4B to become equal to each other at a specific value without the need to control the voltages by exchanging DC power with the exterior. Therefore, reliability of output control is improved with an apparatus structure featuring a reduced cost and advanced compactness.

Third Embodiment

While the foregoing first and second embodiments are configured to each include the two second inverters, there may be provided three or more second inverters.

Figure 14:
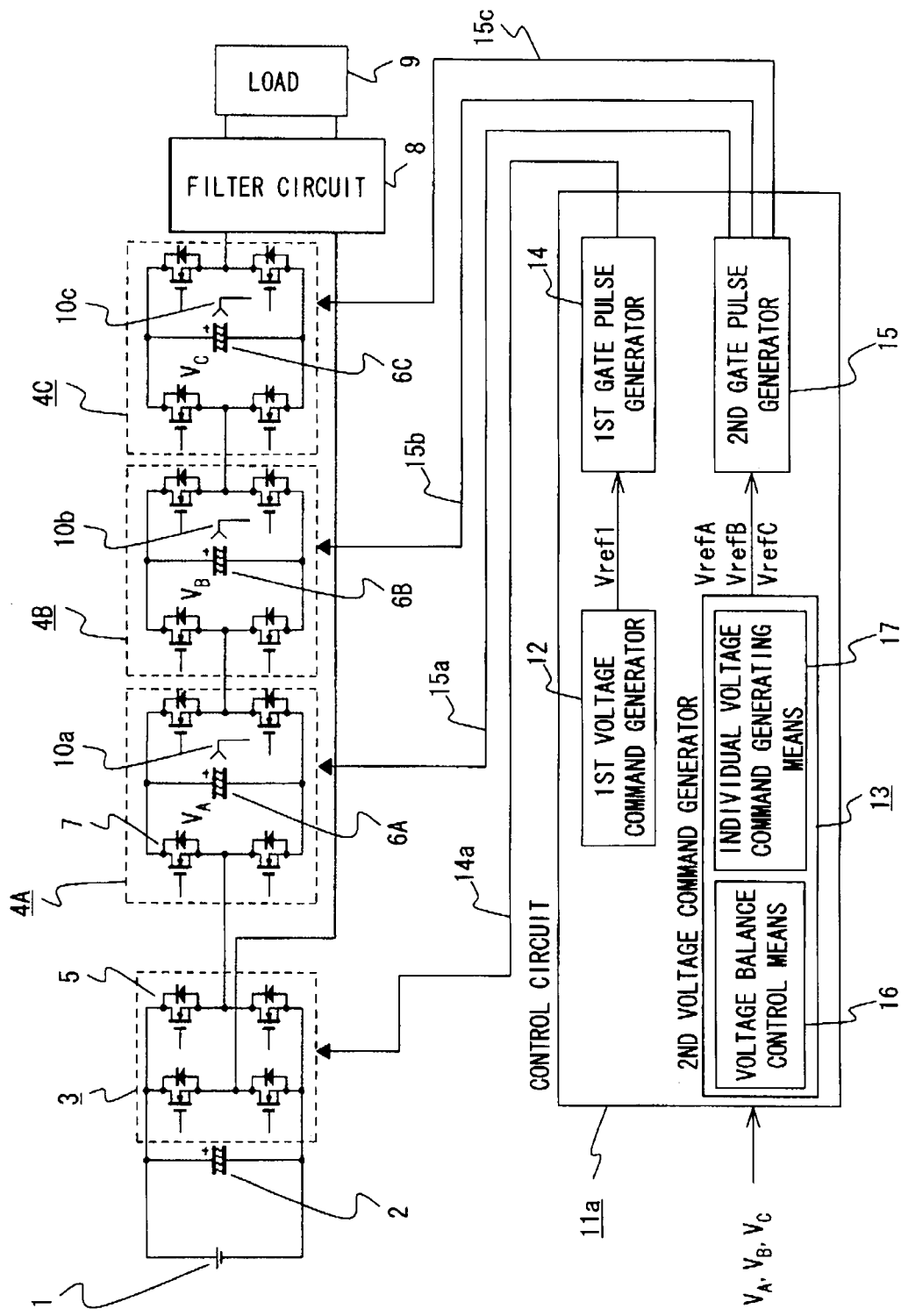
FIG. 14 is a diagram illustrating the configuration of a power converting apparatus according to a third embodiment of the present invention.

FIG. 14 is a diagram illustrating the configuration of a power converting apparatus according to a third embodiment of the present invention.

As illustrated in FIG. 14, a first smoothing capacitor 2 is connected to a first DC power supply 1 to supply DC power to a first inverter 3 made up of a single-phase full-bridge inverter. Three second inverters 4A, 4B, 4C are connected in series to an AC output line of the first inverter 3.

The second inverters 4A, 4B, 4C are respectively provided with mutually independent second smoothing capacitors 6A, 6B, 6C and a plurality of switching devices 7, and output voltages of the individual second inverters 4A, 4B, 4C are superimposed on an output voltage of the first inverter 3, whereby sine-wave AC power is applied to a load 9 through a filter circuit 8. There are also provided voltage sensors 10a, 10b, 10c for detecting voltages $V_A$, $V_B$, $V_C$ of the second smoothing capacitors 6A, 6B, 6C, respectively.

There is further provided a control circuit 11a employing a processing device like a DSP or an FPGA, for example. The control circuit 11a includes a first voltage command generator 12 for generating an output voltage command Vref1 for the first inverter 3, a second voltage command generator 13 for generating output voltage commands VrefA, VrefB, VrefC for the second inverters 4A, 4B, 4C, respectively, a first gate pulse generator 14 for generating a gate pulse 14a for controllably driving the first inverter 3 based on the output voltage command Vref1 for the first inverter 3, and a second gate pulse generator 15 for generating gate pulses 15a, 15b, 15c for controllably driving the second inverters 4A, 4B, 4C based on the output voltage commands VrefA, VrefB, VrefC for the second inverters 4A, 4B, 4C, respectively.

The first voltage command generator 12 generates the output voltage command Vref1 for the first inverter 3 in the same fashion as in the above-described first embodiment.

The second voltage command generator 13 which is provided with voltage balance control means 16 and individual voltage command generating means 17 individually generates the output voltage commands VrefA, VrefB, VrefC for the respective second inverters 4A, 4B, 4C so that the voltages $V_A$, $V_B$, $V_C$ of the second smoothing capacitors 6A, 6B, 6C are balanced one another.

In this case, the three second inverters 4 (4A, 4B, 4C) are divided into two groups one of which includes the two second inverters 4A, 4B and the other includes the remaining second inverter 4C and, based on a comparison between an average voltage of the second smoothing capacitors 6A, 6B and the voltage $V_C$ of the second smoothing capacitor 6C, the group having a higher voltage is referred to as group A in which the voltage is decreased while the group having a lower voltage is referred to as group B in which the voltage is increased. In a case where there are a plurality of inverters in the group including the second inverter 4C, an average voltage is used as the voltage of the second smoothing capacitors.

When the second smoothing capacitors 6 (6A, 6B, 6C) are in the charging mode, the output voltage command for each second inverter 4 in group A is so generated as to have an absolute-valued voltage lower than a reference voltage command 25a which is obtained by dividing a target sum voltage Vref2 into three equal parts and the output voltage command for each second inverter 4 in group B is so generated as to have an absolute-valued voltage higher than the reference voltage command 25a. Also, when the second smoothing capacitors 6 are in the discharging mode, the output voltage command for each second inverter 4 in group A is so generated as to have an absolute-valued voltage higher than the reference voltage command 25a and the output voltage command for each second inverter 4 in group B is so generated as to have an absolute-valued voltage lower than the reference voltage command 25a.

Figure 15:
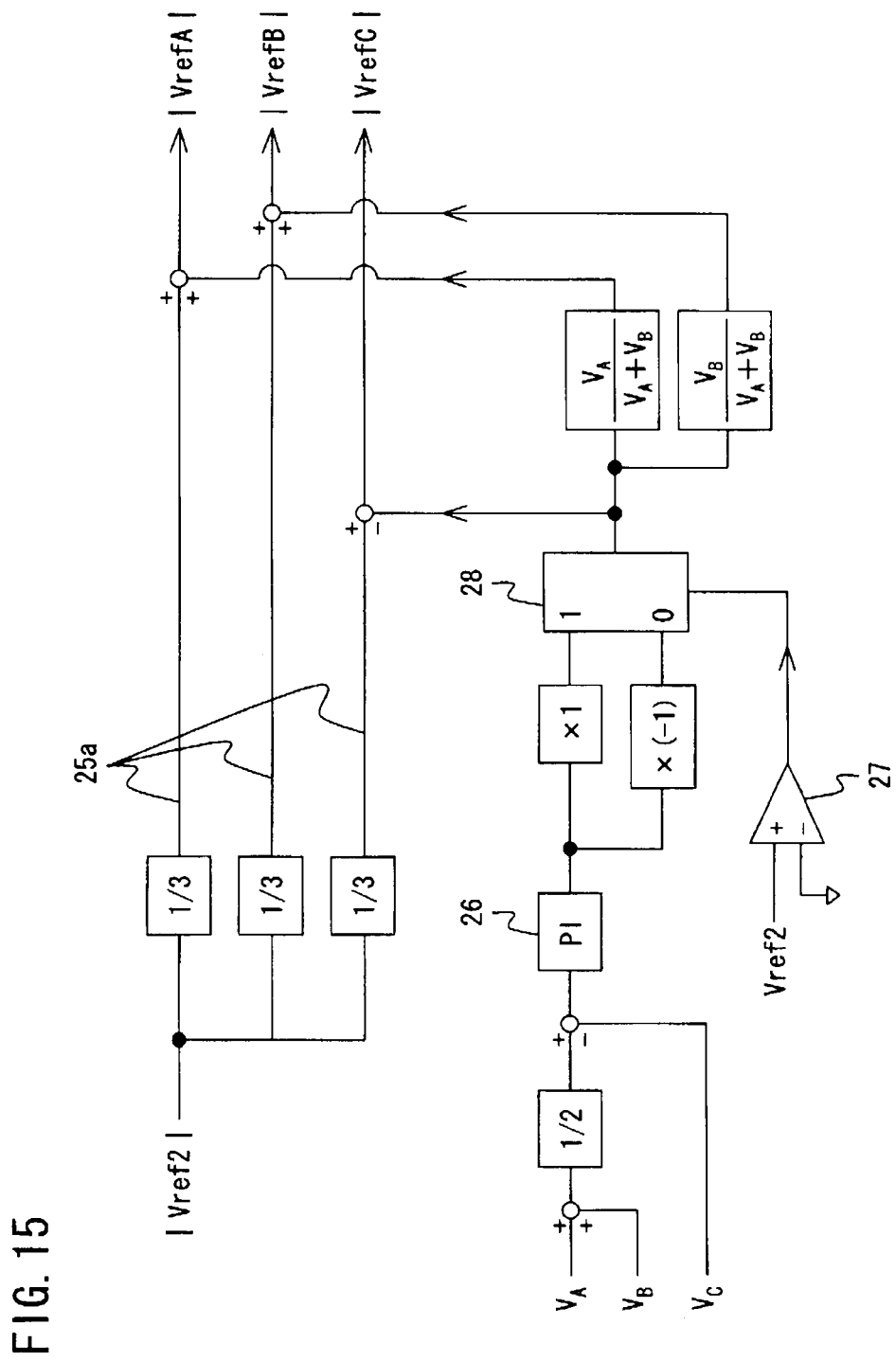
FIG. 15 is a control block diagram of a second voltage command generator according to the third embodiment of the present invention.

FIG. 15 is a control block diagram of the second voltage command generator 13 according to the present embodiment. It is to be noted that FIG. 15 depicts only a case where an output current 23 has a positive polarity for the sake of explanation.

The target sum voltage Vref2 which becomes an output voltage command for a sum voltage 22 that is the sum of the output voltages of the three second inverters 4A, 4B, 4C is generated by subtracting the output voltage command Vref1 for the first inverter 3 from a sine-wave voltage. Then, the reference voltage command 25a is generated by dividing the target sum voltage Vref2 into three equal parts.

On the other hand, an amount of control derived by PI control is generated by a circuit 26 so that the difference between the average voltage of the voltages $V_A$, $V_B$ of the second smoothing capacitors 6A, 6B and the voltage $V_C$ of the remaining second smoothing capacitor 6C becomes zero and, then, positive and negative amounts of control are generated from the aforementioned amount of control and a value obtained by inverting the plus or minus sign of the amount of control. Also, a comparator 27 detects the polarity of the target sum voltage Vref2 and a circuit 28 outputs one of the positive and negative amounts of control depending on the polarity of the target sum voltage Vref2. Then, values obtained by distributing the amount of control output from the circuit 28 according to the ratio of the voltages $V_A$, $V_B$ are individually added to the reference voltage command 25a to generate the output voltage commands VrefA, VrefB and the amount of control is subtracted from the reference voltage command 25a to generate the output voltage command VrefC. It is to be noted that the sum of the three output voltage commands VrefA, VrefB, VrefC always coincides with the target sum voltage Vref2.

Also, since the target sum voltage Vref2, the reference voltage command 25a and the three output voltage commands VrefA, VrefB, VrefC have the same polarity, it is assumed here that the individual output voltage commands VrefA, VrefB, VrefC are generated as absolute values and the reference voltage command 25a is also treated as an absolute value for the sake of simplification.

Again, it is the case in this embodiment that the output voltage commands are generated upon making an adjustment so that the DC bus voltages of the individual second inverters 4A, 4B, 4C are balanced. For this reason, it is possible to control the DC bus voltages of the second inverters 4A, 4B, 4C to become equal to one another at a specific value without the need to control the voltages by exchanging DC power with the exterior. Therefore, reliability of output control is improved with an apparatus structure featuring a reduced cost and advanced compactness.

Incidentally, the DC bus voltages of the second inverters 4 may be balanced by applying the foregoing second embodiment to a power converting apparatus provided with three or more second inverters 4, thereby creating the same advantageous effects.

Specifically, a plurality of second inverters 4 are divided into two groups and, based on a comparison between average voltages of the second smoothing capacitors 6, the group having a higher voltage is referred to as group A in which the voltage is decreased while the group having a lower voltage is referred to as group B in which the voltage is increased. In this case, the below-described control operation is performed when the difference between the average voltages exceeds a specified value. When the second smoothing capacitors 6 are in the charging mode, the output voltage command for each second inverter 4 in group A is set to 0 and the output voltage command for each second inverter 4 in group B only is generated by distributing the target sum voltage Vref2 according to the ratio of the voltages of the second smoothing capacitors 6, for example, to perform output control. Also, when the second smoothing capacitors 6 are in the discharging mode, the output voltage command for each second inverter 4 in group B is set to 0 and the output voltage command for each second inverter 4 in group A only is generated by distributing the target sum voltage Vref2 according to the ratio of the voltages of the second smoothing capacitors 6, for example, to perform output control.

The control operation for charging or discharging the second smoothing capacitors 6 in only one of the groups is possible only during periods when the target sum voltage Vref2 becomes equal to or lower than the voltage level of the sum of the voltages of the second smoothing capacitors 6 of the aforementioned one of the groups in which output control is performed in this case as well. During periods other than the aforementioned periods, the reference voltage command 25a obtained by dividing the target sum voltage Vref2 by the number of the second inverters 4 into equal parts is used as each of the output voltage commands as is the case when the difference between the voltages of the second smoothing capacitors 6 of the different groups falls within a specified value range.

Figure 16:
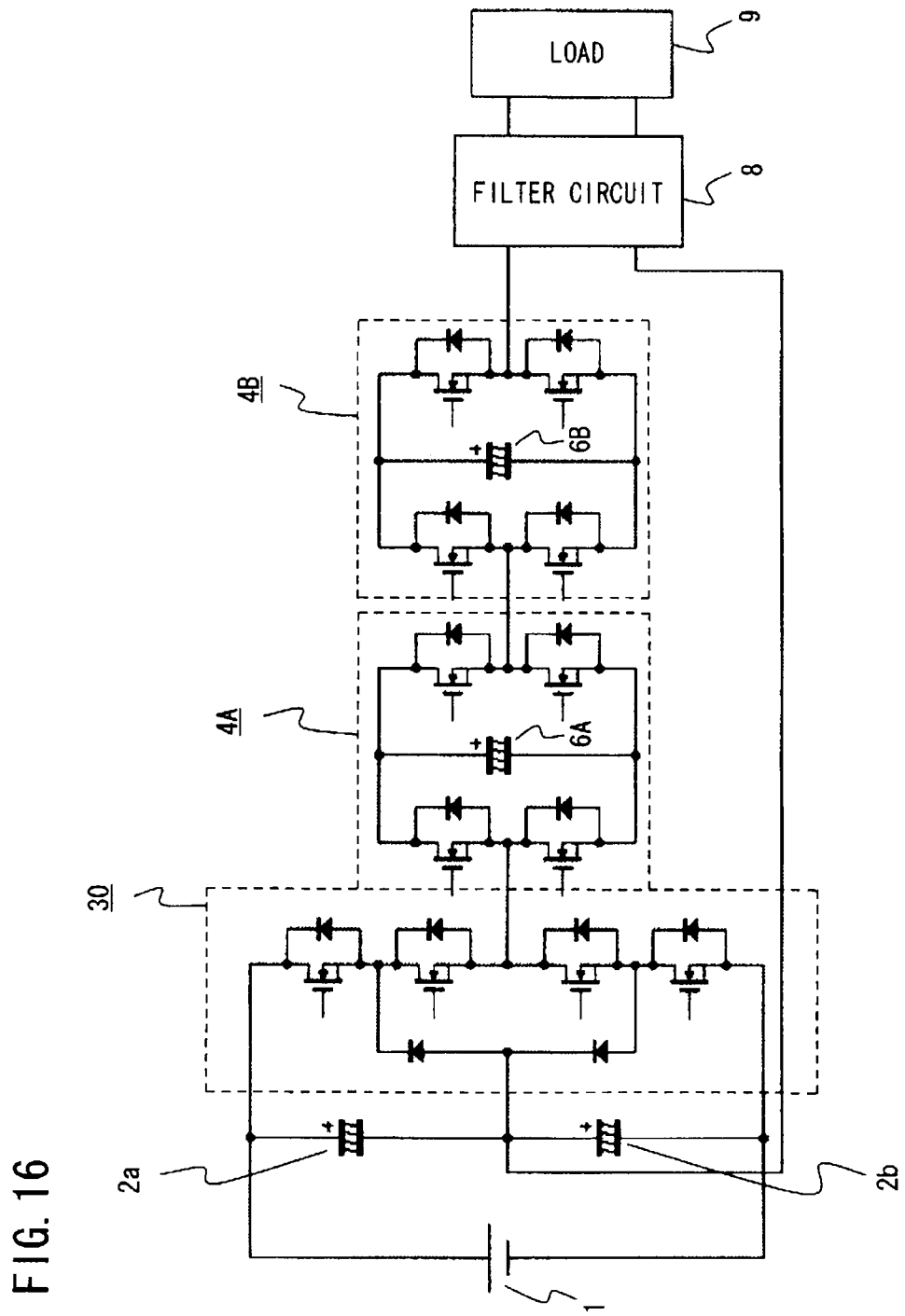
FIG. 16 is a diagram illustrating the configuration of a power converting apparatus according to an alternative example of the third embodiment of the present invention.

Also, the first inverter may be a multi-level inverter like a three-level single-phase inverter 30 as illustrated in FIG. 16. In this case, two series-connected first smoothing capacitors 2a, 2b for smoothing a voltage of the DC power supply 1 are connected.

Figure 17:
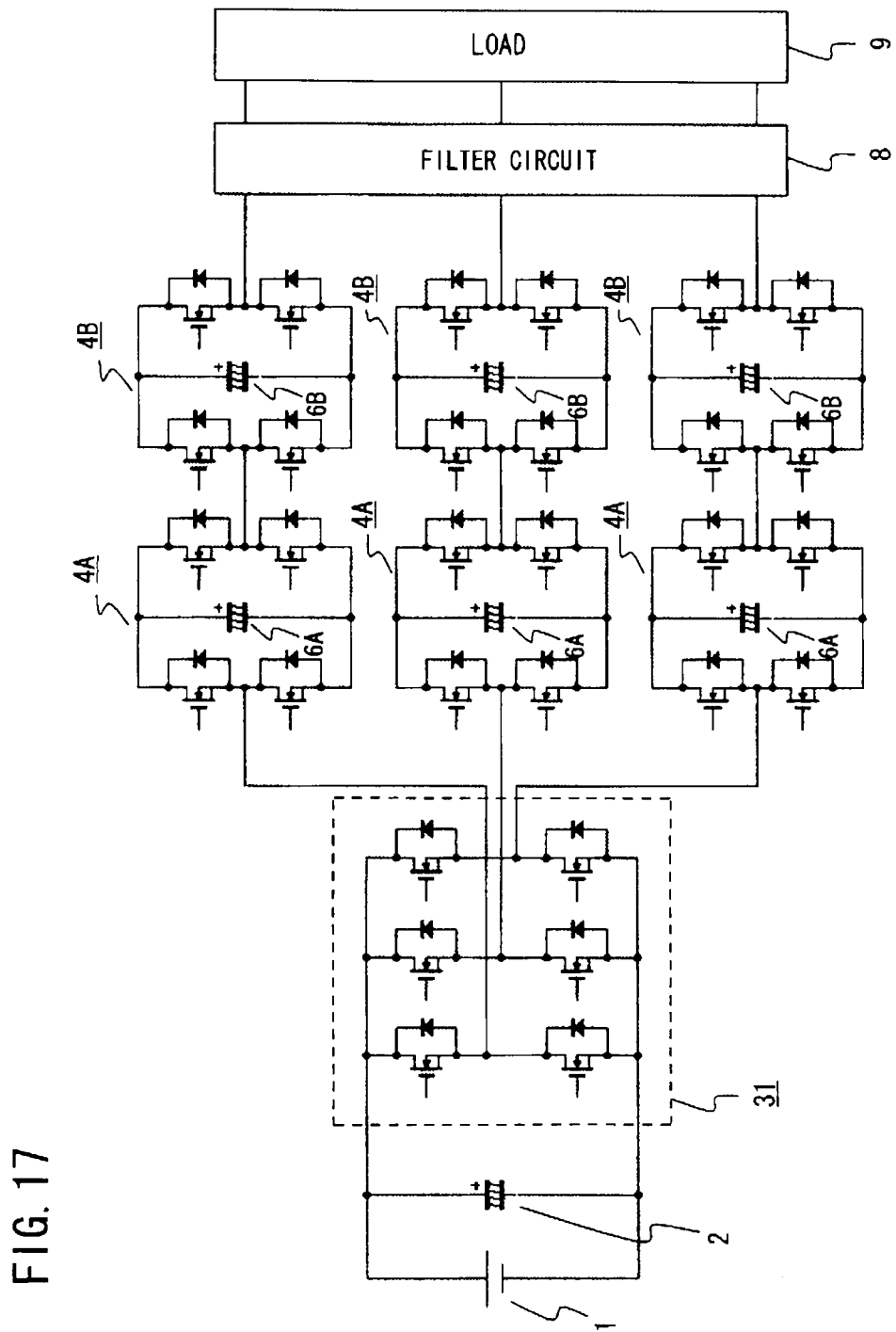
FIG. 17 is a diagram illustrating the configuration of a power converting apparatus according to another alternative example of the third embodiment of the present invention.

Furthermore, the first inverter may be a three-phase inverter 31 as illustrated in FIG. 17, in which case a plurality of second inverters 4A, 4B are individually connected in series to AC output lines of individual phases of the three-phase inverter 31 and the second inverters 4A, 4B of each phase are controlled in the same manner as in each of the above-described embodiments.

Industrial Applicability

It will be appreciated from the foregoing that the present invention can be widely applied to power converting apparatuses which convert DC power into AC power and, in particular, to those used as power conditioners, for example, which connect a photovoltaic voltage or the like to a power system.

The invention claimed is:

1. A power converting apparatus comprising a first inverter which converts DC power fed from a first smoothing capacitor connected to a first DC power supply into AC power and a plurality of second inverters which are connected in series to an AC output line of said first inverter and convert DC power fed from respective second smoothing capacitors into AC power, wherein voltages of said second smoothing capacitors are lower than a voltage of said first smoothing capacitor, said plurality of second inverters output voltages approximately equal to each other by performing PWM control so that an output power balance during one cycle becomes approximately zero, and said power converting apparatus outputs a sum of an output voltage of said first inverter and the output voltages of said plurality of second inverters, said power converting apparatus further comprising:

voltage command generating means for individually generating output voltage commands for said plurality of second inverters, wherein said voltage command generating means generates the output voltage commands upon individually making an adjustment so that the voltages of said individual second smoothing capacitors become equal to each other depending on whether said second smoothing capacitors are in charging or discharging mode while keeping a sum of the individual output voltage commands at a target sum voltage to be matched by a sum of the output voltages of said plurality of second inverters.

2. A power converting apparatus comprising a first inverter which converts DC power fed from a first smoothing capacitor connected to a first DC power supply into AC power and a plurality of second inverters which are connected in series to an AC output line of said first inverter and convert DC power fed from respective second smoothing capacitors into AC power, wherein voltages of said second smoothing capacitors are lower than a voltage of said first smoothing capacitor, said plurality of second inverters output voltages approximately equal to each other by performing PWM control so that an output power balance during one cycle becomes approximately zero, and said power converting apparatus outputs a sum of an output voltage of said first inverter and the output voltages of said plurality of second inverters, said power converting apparatus further comprising:

voltage command generating means for individually generating output voltage commands for said plurality of second inverters, wherein said voltage command generating means generates the output voltage commands upon individually making an adjustment so that the voltages of said individual second smoothing capacitors become equal to each other depending on whether said second smoothing capacitors are in charging or discharging mode while keeping a sum of the individual output voltage commands at a target sum voltage to be matched by a sum of the output voltages of said plurality of second inverters, wherein said voltage command generating means calculates a reference voltage command for individual ones of said plurality of second inverters by dividing the target sum voltage into equal parts and divides said plurality of second inverters into groups including group A in which the voltage of each pertinent one of said second smoothing capacitors is decreased and group B in which the voltage of each pertinent one of said second smoothing capacitors is increased depending on the voltages of said individual second smoothing capacitors, and wherein when said second smoothing capacitors are in the charging mode, said voltage command generating means generates the output voltage command for each pertinent one of said plurality of second inverters of said group A to have an absolute-valued voltage lower than the reference voltage command as well as the output voltage command for each pertinent one of said plurality of second inverters of said group B to have an absolute-valued voltage higher than the reference voltage command; and when said second smoothing capacitors are in the discharging mode, said voltage command generating means generates the output voltage command for each pertinent one of said plurality of second inverters of said group A to have an absolute-valued voltage higher than the reference voltage command as well as the output voltage command for each pertinent one of said plurality of second inverters of said group B to have an absolute-valued voltage lower than the reference voltage command.

3. A power converting apparatus comprising a first inverter which converts DC power fed from a first smoothing capacitor connected to a first DC power supply into AC power and a plurality of second inverters which are connected in series to an AC output line of said first inverter and convert DC power fed from respective second smoothing capacitors into AC power, wherein voltages of said second smoothing capacitors are lower than a voltage of said first smoothing capacitor, said plurality of second inverters output voltages approximately equal to each other by performing PWM control so that an output power balance during one cycle becomes approximately zero, and said power converting apparatus outputs a sum of an output voltage of said first inverter and the output voltages of said plurality of second inverters, said power converting apparatus further comprising:

voltage command generating means for individually generating output voltage commands for said plurality of second inverters, wherein said voltage command generating means generates the output voltage commands upon individually making an adjustment so that the voltages of said individual second smoothing capacitors become equal to each other depending on whether said second smoothing capacitors are in charging or discharging mode while keeping a sum of the individual output voltage commands at a target sum voltage to be matched by a sum of the output voltages of said plurality of second inverters, wherein said voltage command generating means divides said plurality of second inverters into groups including group A in which the voltage of each pertinent one of said second smoothing capacitors is decreased and group B in which the voltage of each pertinent one of said second smoothing capacitors is increased depending on the voltages of said individual second smoothing capacitors, and wherein when said second smoothing capacitors are in the charging mode, said voltage command generating means sets the output voltage command for each pertinent one of said plurality of second inverters of said group A to zero and generates only the output voltage command for each pertinent one of said plurality of second inverters of said group B so as to charge each pertinent one of said second smoothing capacitors, and when said second smoothing capacitors are in the discharging mode, said voltage command generating means sets the output voltage command for each pertinent one of said plurality of second inverters of said group B to zero and generates only the output voltage command for each pertinent one of said plurality of second inverters of said group A so as to discharge each pertinent one of said second smoothing capacitors.

4. The power converting apparatus as recited in claim 3 wherein control operation for charging or discharging said second smoothing capacitors in only one of said groups A and B is performed only during a period when the absolute value of the target sum voltage is smaller than the sum of the voltages of said second smoothing capacitors of said one of said groups.

5. The power converting apparatus as recited in claim 1 wherein said first inverter and said plurality of second inverters are configured with single-phase inverters.

6. The power converting apparatus as recited in claim 5 wherein said first inverter is made up of a full-bridge type or multi-level type single-phase inverter.

7. The power converting apparatus as recited in claim 1 wherein said first inverter is configured with a three-phase inverter, said plurality of second inverters are configured with single-phase inverters, and said plurality of second inverters are individually connected in series to AC output lines of individual phases of said first inverter.

8. The power converting apparatus as recited in claim 1 wherein said first DC power supply is a solar battery.

* * * * *